United States Patent
Shin

(10) Patent No.: US 10,025,417 B2
(45) Date of Patent: Jul. 17, 2018

(54) TOUCH DEVICE CONFIGURED TO CORRECT TOUCH DATA AND DISPLAY INCLUDING THE SAME

(71) Applicant: Samsung Display Co., Ltd., Yongin-si (KR)

(72) Inventor: Ji Hye Shin, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 66 days.

(21) Appl. No.: 14/922,064

(22) Filed: Oct. 23, 2015

(65) Prior Publication Data

US 2016/0274720 A1   Sep. 22, 2016

(30) Foreign Application Priority Data

Mar. 16, 2015 (KR) .................. 10-2015-0035998

(51) Int. Cl.
  *G06F 3/041* (2006.01)
  *G06F 3/0488* (2013.01)

(52) U.S. Cl.
  CPC .......... *G06F 3/0416* (2013.01); *G06F 3/0412* (2013.01); *G06F 3/0414* (2013.01); *G06F 3/0418* (2013.01); *G06F 3/0488* (2013.01); *G06F 2203/04102* (2013.01); *G06F 2203/04103* (2013.01)

(58) Field of Classification Search
  CPC ...... G06F 3/0414; G06F 3/044; G06F 3/0412; G06F 3/0416; G06F 3/0418; G06F 3/0488
  USPC ........................................ 345/173; 178/18.02
  See application file for complete search history.

(56) References Cited

U.S. PATENT DOCUMENTS

| | | | |
|---|---|---|---|
| 2003/0205450 A1* | 11/2003 | Divigalpitiya | G06F 3/044 200/512 |
| 2003/0214486 A1 | 11/2003 | Roberts | |
| 2004/0154375 A1 | 8/2004 | Mattes et al. | |
| 2006/0097975 A1* | 5/2006 | Lee | G06F 3/042 345/98 |
| 2008/0048994 A1 | 2/2008 | Lee et al. | |

(Continued)

FOREIGN PATENT DOCUMENTS

| | | |
|---|---|---|
| JP | 2005526337 | 9/2005 |
| JP | 2013156895 | 8/2013 |
| KR | 1020080018556 | 2/2008 |

*Primary Examiner* — Adam J Snyder
(74) *Attorney, Agent, or Firm* — H.C. Park & Associates, PLC

(57) ABSTRACT

An exemplary embodiment provides a touch device including: a touch panel including: first and second substrates; and a pressure sensor including: a first electrode disposed on the first substrate; a second electrode disposed on the second substrate; an insulating layer disposed between the first and second electrodes; and a spacer, wherein the pressure sensor is configured to transmit a touch signal corresponding to an intensity of pressure applied to the second substrate through the pressure sensor in response to a touch; and a touch controller configured to: acquire touch data at respective nodes from the touch signal; acquire a touch data variation at the respective nodes based on previous touch data and the touch data at the respective nodes; correct the touch data at the respective nodes based on the touch data variation; and acquire a coordinate of the touch location based on the corrected touch data.

16 Claims, 5 Drawing Sheets

(56) References Cited

U.S. PATENT DOCUMENTS

| | | | | |
|---|---|---|---|---|
| 2010/0026639 A1* | 2/2010 | Lee | ................ | G06F 3/0412 345/173 |
| 2010/0103116 A1* | 4/2010 | Leung | ................ | G06F 3/044 345/173 |
| 2010/0141600 A1* | 6/2010 | Park | ................ | G06F 3/045 345/173 |
| 2010/0231530 A1* | 9/2010 | Lin | ................ | G06F 3/044 345/173 |
| 2010/0253651 A1* | 10/2010 | Day | ................ | G06F 3/044 345/175 |
| 2010/0289759 A1* | 11/2010 | Fisher | ................ | G06F 3/044 345/173 |
| 2011/0090175 A1* | 4/2011 | Mamba | ................ | G06F 3/044 345/174 |
| 2012/0086666 A1* | 4/2012 | Badaye | ................ | G06F 3/044 345/174 |
| 2012/0098783 A1* | 4/2012 | Badaye | ................ | G06F 3/044 345/174 |
| 2013/0206568 A1* | 8/2013 | Wu | ................ | G06F 3/044 200/600 |
| 2013/0234734 A1* | 9/2013 | Iida | ................ | G06F 3/044 324/661 |
| 2014/0043289 A1* | 2/2014 | Stern | ................ | G06F 3/044 345/174 |

\* cited by examiner

TOUCH DEVICE CONFIGURED TO CORRECT TOUCH DATA AND DISPLAY INCLUDING THE SAME

CROSS-REFERENCE TO RELATED APPLICATION

This application claims priority from and the benefit of Korean Patent Application No. 10-2015-0035998, filed on Mar. 16, 2015, which is hereby incorporated by reference for all purposes as if fully set forth herein.

BACKGROUND

Field

Exemplary embodiments relate to a touch device and a display device including the same.

Discussion of the Background

A display panel including a touch panel provides an interactive system to touchable electronic devices, such as a mobile phone, a tablet computer, a laptop computer, or a desktop computer. The touchable electronic devices may provide an intuitive user interface since a graphic image is displayed on the display panel and a user touches a screen (e.g., uses an active stylus pen, a passive stylus pen, or a part of the body such as a finger) to interact with the electronic device.

Flexible display devices that may be folded or bent are actively being studied as next-generation display devices. The flexible display device includes a plurality of pixels formed on a flexible substrate. The flexible substrate used for the flexible display device is made of a material such as plastic that is light weight, impact resistant, and foldable and/or bendable. The flexible display device may include display elements including an organic light emitting diode display element, a liquid crystal display element, and an electrophoretic display (EPD) element.

The flexible display device may be transformed into various shapes by folding or bending to maximize portability and may be applicable to various fields.

The touch panel combined with the flexible display device may also have a flexible characteristic. Accordingly, a touch panel for detecting a touch position from a pressure applied to a displaying side of the flexible display device by disposing a pressure sensor on a rear side of the flexible display device has been proposed.

The touch panel combined with the flexible display device includes a spacer made of an elastic material to satisfy the flexible characteristic. Hence, it may sensitively react to a small touch pressure to have improved touch reactivity, but the spacer may have slow restoration after the touch is released. The above-noted characteristic may lead to an error due to recognizing a touch released state as a touched state on the touch panel and may have a problem of delay in time until a next touch input becomes allowable.

The above information disclosed in this Background section is only for enhancement of understanding of the background of the inventive concept, and therefore it may contain information that does not form the prior art that is already known in this country to a person of ordinary skill in the art.

SUMMARY

Exemplary embodiments provide a touch device for preventing touch misrecognition and improving touch reaction time, and a display device including the same.

Additional aspects will be set forth in the detailed description which follows, and, in part, will be apparent from the disclosure, or may be learned by practice of the inventive concept.

An exemplary embodiment provides a touch device including: a touch panel including: a first substrate and a second substrate; and a pressure sensor including: a first electrode disposed on the first substrate; a second electrode disposed on the second substrate; an insulating layer disposed between the first and second electrodes; and a spacer, wherein the pressure sensor is configured to transmit a touch signal corresponding to an intensity of pressure applied to the second substrate through the pressure sensor in response to a touch; and a touch controller configured to: acquire touch data at respective nodes from the touch signal; acquire a touch data variation at the respective nodes based on previous touch data and the touch data at the respective nodes; correct the touch data at the respective nodes based on the touch data variation; and acquire a coordinate of a touch location of the touch based on the corrected touch data.

An exemplary embodiment provides a display device including the touch device including: a touch panel including: first and second substrates; and a pressure sensor including: a first electrode disposed on the first substrate; a second electrode disposed on the second substrate; an insulating layer disposed between the first and second electrodes; and a spacer, wherein the pressure sensor is configured to transmit a touch signal corresponding to an intensity of pressure applied to the second substrate through the pressure sensor in response to a touch; and a touch controller configured to: acquire touch data at respective nodes from the touch signal; acquire a touch data variation at the respective nodes based on previous touch data and the touch data at the respective nodes; correct the touch data at the respective nodes based on the touch data variation; and acquire a coordinate of the touch location based on the corrected touch data.

An exemplary embodiment also provides a method of operating touch device including a touch panel including a pressure sensor disposed, the method including: acquiring touch data at respective nodes from touch signal transmitted from the pressure sensor; acquiring a touch data variation at the respective nodes based on previous touch data and the touch data at the respective nodes; correcting the touch data at the respective nodes based on the touch data variation; and acquiring a coordinate of the touch location based on the corrected touch data.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
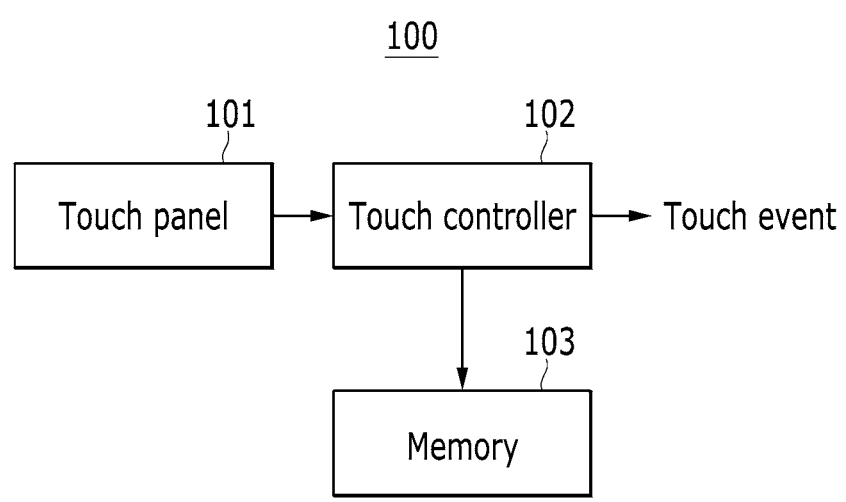
FIG. 1 shows a block diagram of a touch device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein. A display device according to an exemplary embodiment will be described with reference to accompanying drawings.

Figure 2:
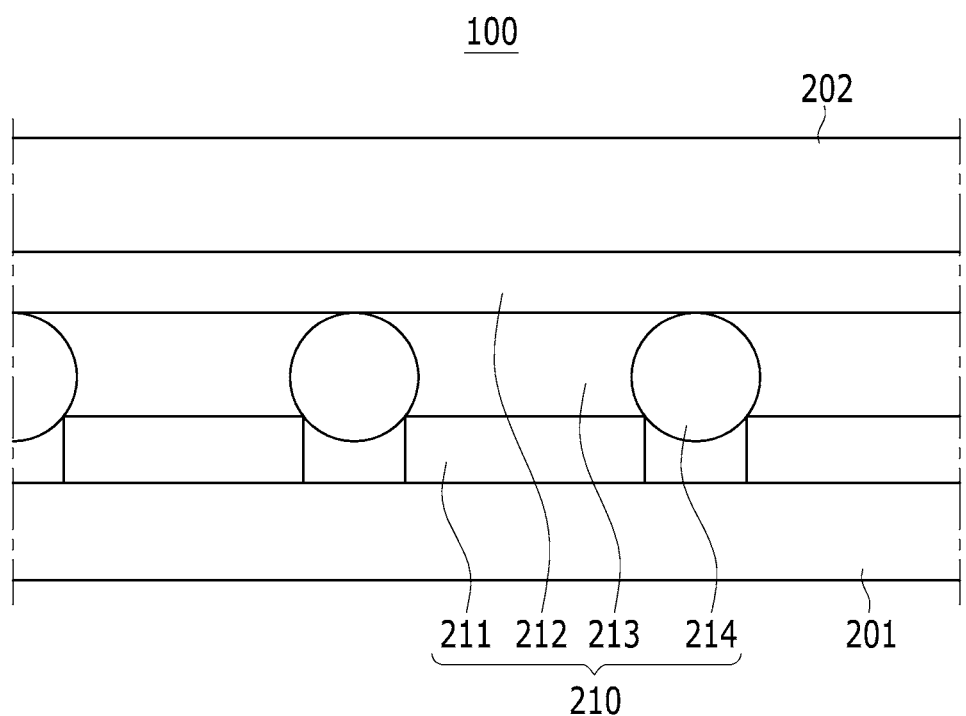
FIG. 2 shows a cross-sectional view of a touch panel according to an exemplary embodiment.
Figure 3:
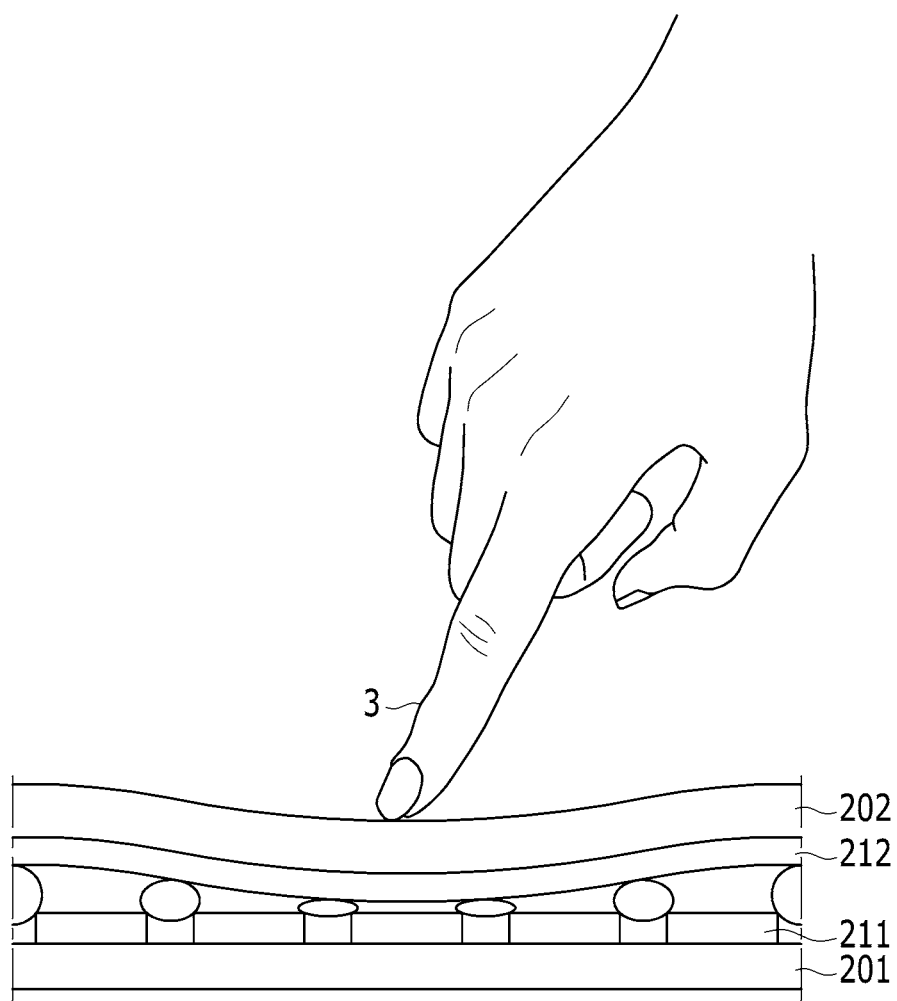
FIG. 3 shows a principle for detecting a touch in a touch device according to an exemplary embodiment.

FIG. 1 shows a block diagram of a touch device according to an exemplary embodiment. FIG. 2 shows a cross-sectional view of a touch panel according to an exemplary embodiment. FIG. 3 shows a principle for detecting a touch in a touch device according to an exemplary embodiment.

Referring to FIG. 1, the touch may include a touch panel 101, a touch controller 102, and a memory 103.

The touch panel 101 detects a user's touch, generates a touch signal, and transmits the touch signal to the touch controller 102. Accordingly, the touch panel 101 may detect the user's touch using any type of pointing implement, including a part of the body (e.g., a finger), a stylus, and the like. The pointing implements refer to any object, including devices (e.g., an active stylus and a passive stylus) and parts of the body that can be detected by the touch panel 101 (e.g., fingers or head).

Referring to FIG. 2, the touch panel 101 may include a first substrate 201 and a second substrate 202 disposed with a predetermined distance therebetween, and a pressure sensor 210 disposed between the first and second substrates 201 and 202. The pressure sensor 210 may include first and second electrodes 211 and 212, an insulating layer 213, and a spacer 214 disposed between the first and second substrates 201 and 202. The pressure sensor 210 transmits an electrical signal corresponding to a pressure applied to a node of the touch panel 101 by the user's touch. For description purpose, the electrical signal transmit by the pressure sensor 210 will be referred to as a touch signal.

One substrate of the first and second substrates 201 and 202 may be a flexible substrate that may be deformed by the user's touch pressure. For example, the second substrate 202 may be a flexible substrate deformable by the user's touch input.

The other one substrate of the first and second substrates 201 and 202 may be a "rigid" substrate that is relatively more rigid than the flexible substrate and may be relatively less deformed than the flexible substrate when an external pressure is applied. For example, the first substrate 201 may be a rigid substrate that is relatively more rigid than the second substrate 202.

A plurality of first electrodes 211 and a plurality of second electrodes 212 are disposed on respective surfaces of the first and second substrates 201 and 202 which face each other. The plurality of first and second electrodes 211 and 212 are formed crossing each other, and respective nodes on the touch panel 101 are defined by crossing points of the plurality of first electrodes 211 and the plurality of second electrodes 212.

The first and second electrodes 211 and 212 are disposed with a predetermined distance therebetween, and an insulating layer 213 is disposed between the first and second electrodes 211 and 212.

A plurality of spacers 214 are disposed in the insulating layer 213 to maintain the predetermined distance between the first and second electrodes 211 and 212. The spacers 214 may be made of an elastic material.

Referring to FIG. 3, when the user's finger 3 touches a predetermined region, the second substrate 202 is pushed and deformed due to the pressure applied by the touch. The deformation of the second substrate 202 alters the distance between the second electrode 212 and the first electrode 211 at a region (or a node) where the first electrode 211 crosses the second electrode 212, changing a capacitance formed by the first and second electrodes 211 and 212 at the corresponding touch region. The change of capacitance in the touch region changes an electrical signal (or a touch signal) transmitted to the touch controller 102 by the second electrode 212 and/or the first electrode 211, a sensing electrode, and the touch controller 102 may recognize the touch signal to detect the touch position.

Referring to FIG. 1, the touch controller 102 transmits a driving signal to the touch panel 101 to drive the touch panel 101. That is, the touch controller 102 transmits a voltage to the touch panel 101 to drive the first and second electrodes 211 and 212.

When the touch panel 101 transmits the touch signal, the touch controller 102 analyzes it and transmits a touch event including a touch coordinate.

A method for a touch controller 102 to detect a touch coordinate according to an exemplary embodiment will now be described with reference to FIG. 4.

Figure 4:
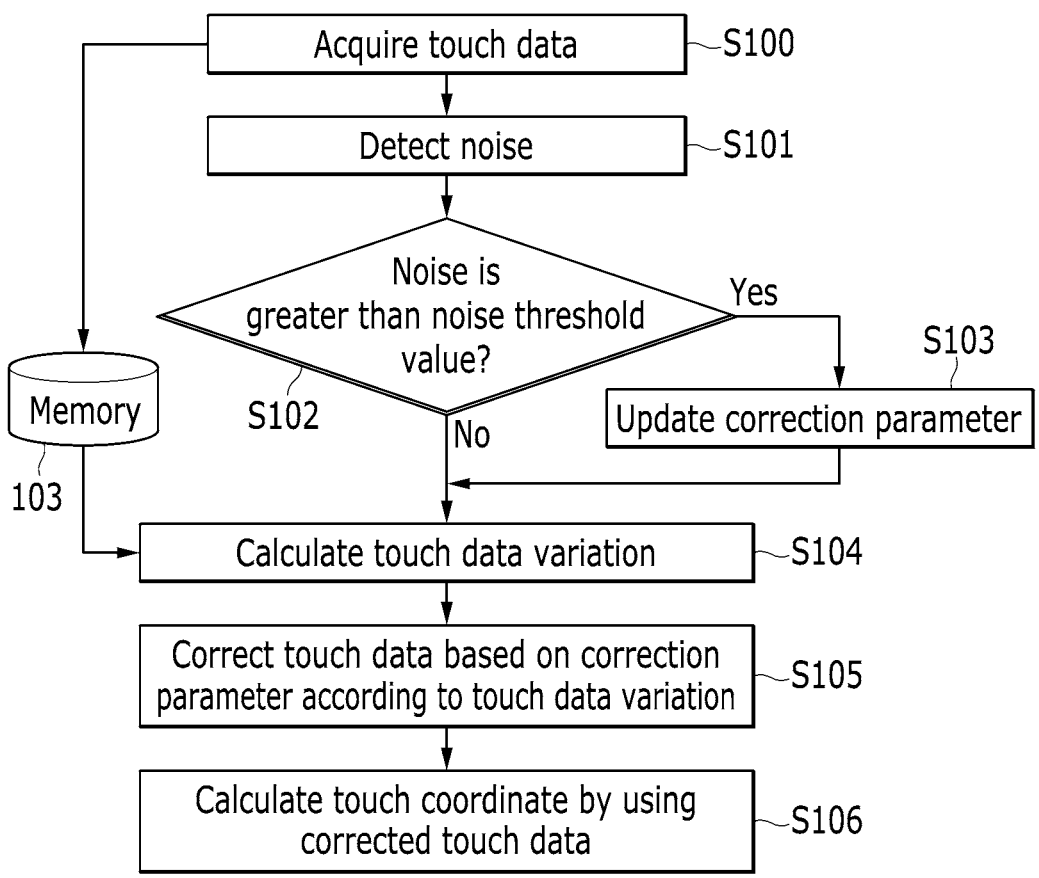
FIG. 4 shows a flowchart for a method of detecting a touch in a touch device according to an exemplary embodiment.

FIG. 4 shows a flowchart of a method for detecting a touch in a touch device according to an exemplary embodiment.

Referring to FIGS. 1 through 4, the touch controller 102 receives a touch signal from the touch panel 101 to acquire touch data (S100). The touch signal transmitted by the touch panel 101 is an electrical signal corresponding to the intensity of the pressure applied to each node of the touch panel 101. The touch data corresponds to a difference in signal intensity between the touch signal received from the touch panel 101 in a present frame (or at a present touch detecting time) and a predetermined baseline signal. The baseline signal corresponds to the touch signal of the touch panel 101 when no touch is generated.

The touch controller 102 is configured to store the acquired touch data from the touch signal of the touch panel 101 in a memory 103.

The touch controller 102 analyzes the touch data to detect noise included in the touch signal (S101). The noise included in the touch signal represents environmental noise such as power noise input to the touch panel 101 when the touch device 100 is charged or noise input to the touch panel 101 by an external light source, and the noise is shown wider than the user's touch region.

Therefore, during detecting noise (S101), the touch controller 102 detects nodes that have touch data greater than a predetermined value, and when a number of detected nodes is greater than a predetermined number, the touch controller 102 determines that the noise is input to the touch panel 101. When the touch controller 102 determines that the noise is input to the touch panel 101, the touch controller 102 may calculate the noise input to the touch panel 101 from the touch data. For example, the touch controller 102 may calculate an average of the touch data as noise, the touch controller 102 may calculate average touch data in the region in which touch data that are greater than a predetermined value are detected as noise, and the touch controller 102 may calculate a maximum value of the touch data as noise.

The touch controller 102 compares the calculated noise to a predetermined noise threshold value (S102).

When the noise is determined to be greater than a noise threshold value, the touch controller 102 updates a correction parameter to be used to correct touch data (S105) based upon the calculated noise (e.g., per-node average noise or maximum noise) (S103). A method for updating a correction parameter will be described in detail with reference to a description of correcting the touch data (S105).

When the noise is determined to be less than the noise threshold value, the correction parameter is not updated.

The spacer 214 of the pressure sensor 210 is made of an elastic material, so it may sensitively react to a small touch pressure to improve touch detecting sensitivity. However, a restoring force of the spacer 214 may be reduced and a delay time may occur for the spacer 214 to recover to the original shape after the touch is released is increased. The delay due to the reduced restoring force of the spacer 214 may generate misrecognition of a touch by the touch controller 102, as well as delay in the time until the next touch input may be recognized.

Therefore, before calculating the touch coordinate, the touch controller 102 may determine whether a present state of the touch panel 101 is a touched state, a touch released state, or a restoring state based on the touch data.

To determine the present state of the touch panel 101, the touch controller 102 calculates a variation of per-time touch data for each node (S104). A shape deformation amount per time of the spacer 214 of the touch panel 101 is relatively lower during the restoring state in which the shape is changing by its restoring force, compared to the shape deformation amount per time during the touched state in which the shape is deformed by an external pressure, and the touch released state. Accordingly, the touch signal transmitted by the pressure sensor 210 of the touch panel 101 shows relatively greater variation during the touched state and the touch released state, and shows relatively lower variation during the restoring state.

Therefore, the touch controller 102 may calculate the variation of touch data for respective nodes to determine the present states of the touch panel 101 at the respective nodes.

To calculate the variation of the touch data, the touch controller 102 reads touch data of each nodes stored during a previous frame (or a previous touch detecting time) from the memory 103 and touch data of the respective nodes stored during a present frame (or at a present touch detecting time). The touch controller 102 calculates a difference in value of the touch data of the previous frame and the present frame of the respective nodes.

The touch controller 102 acquires a correction parameter based upon the variation of the touch data calculated for the respective nodes, and uses the correction parameter to correct the acquired touch data in the present frame (S105). The touch controller 102 may detect nodes which shows a variation of touch data is within a predetermined range, determine that the detected node is in the restoring state after a touch release, and perform a correcting process using a correction parameter. That is, regarding the nodes for which the variation of touch data is within a predetermined range, the touch controller 102 uses the correction parameter to correct the touch data of a node which shows data corresponding to the touch released state. That is, the touch controller 102 may use the correction parameter to correct the touch data of the nodes that are restoring back to the original state, so that error (or a noise) in detecting the touch may be reduced.

When the noise is input to the touch panel 101, the touch signal at each node is influenced by the noise, so the noise may be removed from the touch data to improve the detection accuracy of the touch coordinate.

When noise is input to the touch panel 101, the touch controller 102 uses the correction parameter updated through the operation S103 to correct the touch data. That is, the touch controller 102 updates the correction parameter to add/subtract a correction value corresponding to noise based on the touch data for each nodes of the touch panel 101 (S103), and uses the updated correction parameter to correct the touch data for respective nodes.

When the touch data is corrected (S105), the touch controller 102 may use the touch data to calculate a touch coordinate (S106). That is, the touch controller 102 detects the node for which the corrected touch data is greater than a predetermined touch threshold value, and acquires the touch coordinate based upon the position of the detected nodes.

The touch device 100 may be integrated and/or combined with the display panel of the display device and may be operable as a user interface device of the display device.

Figure 5:
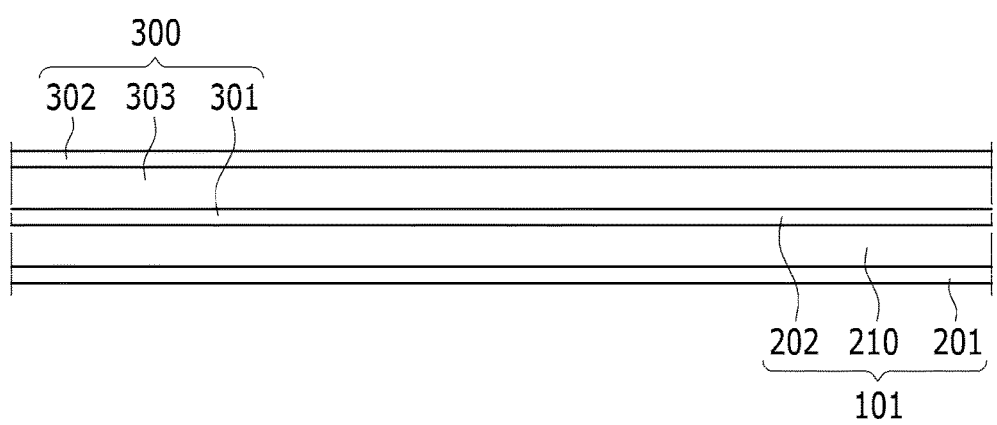
FIG. 5 shows a cross-sectional view of a flexible display device according to an exemplary embodiment.

For example with reference to FIG. 5, the touch panel 101 of the touch device 100 may be combined with a rear side of the display panel 300 of the flexible display device. The display panel 300 of the flexible display device includes a lower substrate 301, an upper substrate 302, an element layer 303 including a plurality of light-emitting devices (not shown) configuring a plurality of pixels disposed between the lower and upper substrates 301 and 302, and a driving circuit (not shown).

In the exemplary embodiment, referring to FIG. 5, the touch panel 101 may form the lower substrate 301 of the display panel 300. More specifically, a second substrate 202 of the touch panel 101 may form the lower substrate 301 of the display panel 300. In this case, a pressure sensor 210 is formed between the lower substrate 301 of the display panel 300 and the first substrate 201 of the touch panel 101.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch device comprising:
   a touch panel comprising:
   a first substrate and a second substrate; and
   a pressure sensor, the pressure sensor comprising:
   a first electrode disposed on the first substrate;
   a second electrode disposed on the second substrate;
   an insulating layer disposed between the first electrode and the second electrode; and
   a spacer,
   wherein the pressure sensor is configured to transmit a touch signal corresponding to an intensity of pressure applied to the second substrate through the pressure sensor in response to a touch; and
   a touch controller configured to:
   acquire touch data at respective nodes from the touch signal;
   acquire a touch data variation at the respective nodes based on previous touch data and the touch data at the respective nodes;
   correct the touch data at the respective nodes based on the touch data variation; and
   acquire a coordinate of a touch location of the touch based on the corrected touch data,
   wherein the touch controller is configured to:
   recognize nodes in a restoring state based on the touch data variation; and
   correct the touch data of the nodes recognized as in the restoring state with a correction parameter, the correction parameter corresponding to the touch data variation of the respective nodes,
   wherein the restoring state is a state of the spacer recovering to an original shape after a touch release.

2. The touch device of claim 1, wherein the touch controller is further configured to recognize a node in the restoring state by recognizing the node having the touch data variation within a predetermined range.

3. The touch device of claim 1, wherein the correction parameter corresponds to a touch released state of the respective nodes.

4. The touch device of claim 1, wherein the touch controller configured to acquire the touch data from a difference in signal intensity between the touch signal and a predetermined baseline signal.

5. The touch device of claim 1, wherein the touch controller is configured to calculate noise from the touch data in response to detecting that a number of the nodes having the touch data greater than a predetermined value is greater than a predetermined number.

6. The touch device of claim 5, wherein the touch controller is configured to update the correction parameter based on the noise in response to detecting that the noise is greater than a predetermined threshold value.

7. The touch device of claim 1, wherein the spacer is made of an elastic material.

8. The touch device of claim 1, wherein the second substrate is a flexible substrate.

9. The touch device of claim 8, wherein the first substrate is more rigid compared to the second substrate.

10. A display device, comprising: a touch device comprising:
a touch panel comprising:
a first substrate and a second substrate; and
a pressure sensor, the pressure sensor comprising:
a first electrode disposed on the first substrate;
a second electrode disposed on the second substrate;
an insulating layer disposed between the first electrode and the second electrode; and
a spacer,
wherein the pressure sensor is configured to transmit a touch signal corresponding to an intensity of pressure applied to the second substrate through the pressure sensor in response to a touch; and
a touch controller configured to:
acquire touch data at respective nodes from the touch signal;
acquire a touch data variation at the respective nodes based on previous touch data and the touch data at the respective nodes;
recognize nodes in a restoring state based on the touch data variation;
correct the touch data of the nodes recognized as in the restoring state with a correction parameter, the correction parameter corresponding to based on the touch data variation of the respective nodes,
wherein the restoring state is a state of the spacer recovering to an original shape after a touch release.

11. The display device of claim 10, further comprising a display panel including an upper substrate and a lower substrate, and a light-emitting device and a driving circuit disposed between the upper substrate and the lower substrate and configuring a plurality of pixels, wherein the lower substrate is used as the second substrate.

12. A method of operating touch device comprising a touch panel comprising a pressure sensor configured to detect a touch, the method comprising:
acquiring touch data at respective nodes from touch signal transmitted from the pressure sensor;
acquiring a touch data variation at the respective nodes based on previous touch data and the touch data at the respective nodes;
correcting the touch data at the respective nodes based on the touch data variation;
acquiring a coordinate of a touch location of the touch based on the corrected touch data;
recognizing nodes in a restoring state based on the touch data variation; and
correcting the touch data of the nodes recognized as in the restoring state with a correction parameter, the correction parameter corresponding to the touch data variation of the respective nodes,
wherein the pressure sensor comprises a first electrode, a second electrode, an insulating layer disposed between the first electrode and the second electrode, and a spacer, and
wherein the restoring state is a state of the spacer recovering to an original shape after a touch release.

13. The method of claim 12, further comprising:
recognizing a node in the restoring state by recognizing the node having the touch data variation within a predetermined range.

14. The method of claim 12, further comprising:
acquiring the touch data from a difference in signal intensity between the touch signal and a predetermined baseline signal.

15. The method of claim 12, further comprising:
calculating noise from the touch data in response to detecting that a number of the nodes having the touch data greater than a predetermined value is greater than a predetermined number.

16. The method of claim 15, further comprising:
updating the correction parameter based on the noise in response to detecting that the noise is greater than a predetermined threshold value.

* * * * *